(12) United States Patent
Fukuhara et al.

(10) Patent No.: US 7,433,541 B2
(45) Date of Patent: Oct. 7, 2008

(54) IMAGE SYNTHESIZING APPARATUS AND METHOD

(75) Inventors: Takahiro Fukuhara, Kanagawa (JP); Seiji Kimura, Chiba (JP); Hitoshi Kiya, Tokyo (JP)

(73) Assignee: Sony Corporation, Tokyo (JP)

( * ) Notice: Subject to any disclaimer, the term of this patent is extended or adjusted under 35 U.S.C. 154(b) by 764 days.

(21) Appl. No.: 10/830,668

(22) Filed: Apr. 22, 2004

(65) Prior Publication Data

US 2004/0264784 A1 Dec. 30, 2004

(30) Foreign Application Priority Data

Apr. 24, 2003 (JP) ............... 2003-120367

(51) Int. Cl.
*G06K 9/36* (2006.01)
(52) U.S. Cl. ............ 382/284; 382/232; 345/139; 375/240.26
(58) Field of Classification Search ........... 382/240, 382/243, 251, 284; 375/240.26
See application file for complete search history.

(56) References Cited

U.S. PATENT DOCUMENTS

| | | | | |
|---|---|---|---|---|
| 5,287,093 A | * | 2/1994 | Amano et al. | 345/639 |
| 5,761,342 A | * | 6/1998 | Yoshida | 382/234 |
| 6,983,075 B2 | * | 1/2006 | Schwartz et al. | 382/251 |
| 2002/0037112 A1 | * | 3/2002 | Matsumoto | 382/238 |
| 2002/0061140 A1 | * | 5/2002 | Kajiwara | 382/233 |
| 2002/0064232 A1 | * | 5/2002 | Fukuhara et al. | 375/240.26 |
| 2003/0016306 A1 | * | 1/2003 | Ogata et al. | 348/671 |

FOREIGN PATENT DOCUMENTS

| | | | |
|---|---|---|---|
| JP | 04211295 A | * | 8/1992 |
| JP | 2000-078467 | | 3/2000 |
| JP | 2000-184278 | | 6/2000 |

* cited by examiner

*Primary Examiner*—Samir A. Ahmed
*Assistant Examiner*—Aklilu K Woldemariam
(74) *Attorney, Agent, or Firm*—Finnegan, Henderson, Farabow, Garrett, Dunner, L.L.P.

(57) ABSTRACT

In an image synthesizer (1), code stream analyzers (10, 11), code block extraction units (12, 13) and EBCOT decoders (14, 15) work together to decode encoded code streams (D10, D11) encoded according to the MPEG-2000 Standard and generate quantization coefficients (D16, D17) for each code block. In a cross-fading unit (16), multipliers (17, 18) multiply the quantization coefficients (D16, D17) by coefficients ($\alpha(t)$, $(1-\alpha(t))$) and an adder (19) adds together the results of multiplication to provide a cross-fading quantization coefficient (D20). An EBCOT encoder (20), rate controller (21) and code stream generator (22) work together to encode the cross-fading quantization coefficient (D20) to provide a final encoded code stream (D23). Therefore, the image synthesizer (1) can combine two encoded code streams easily and effectively with a reduced use of a memory capacity.

5 Claims, 11 Drawing Sheets

IMAGE SYNTHESIZING APPARATUS AND METHOD

BACKGROUND OF THE INVENTION

1. Field of the Invention

The present invention generally relates to an image synthesizing apparatus and method, for combining two images encoded according to the JPEG-2000 Standard, for example, and more particularly to an image synthesizing apparatus and method suitable for use in the cross fading.

This application claims the priority of the Japanese Patent Application No. 2003-120367 filed on Apr. 24, 2003, the entirety of which is incorporated by reference herein.

2. Description of the Related Art

Conventionally, the cross fading is well-known as an image processing technique for representing a transition from one image as a whole to another, for example (cf. Japanese Published Unexamined Patent Application Nos. 2000-78467 and -184278). The cross-fading technique is used in the computer graphics, special playback in a broadcast equipment, special playback in a camcorder, image processing in a game machine, etc.

Normally, the cross fading is implemented by linearly interpolating pixels included in two different images and taking spatially corresponding positions in the images, respectively, and combining the two images together.

Recently, more and more researches have been done of the techniques of dividing an image into a plurality of frequency bands by a so-called filter bank including a high-pass filter and low-pass filter in combination to encode each of the frequency bands. Of such techniques, the wavelet transform coding is considered as a new promising technique which will take the place of DCT (discrete cosine transform) because a high compression results in no considerable block distortion as in the DCT. For example, the JPEG-2000 Standard established as an international standard in January, 2001 has attained a greater improvement in efficiency of coding than the conventional JPEG by adopting a combination of the wavelet transform and a high-efficiency entropy coding (bit modeling and arithmetic coding, both in units of a bit plane).

Note here that to form an encoded code stream of a cross-faded image from an encoded code stream of each of two images with the use of the above-mentioned conventional technique, it is necessary to decode the encoded code streams according to the JPEG-2000 Standard, combine the two decoded images thus acquired by the linear interpolation to generate a cross-faded image, and encode the cross-faded image according to the JPEG-2000 Standard.

However, such a technique requires a memory for storing the two decoded images and also a memory for storing the cross-faded image. In addition, it needs both an image decoder and image encoder, which comply with the JPEG-2000 Standard.

OBJECT AND SUMMARY OF THE INVENTION

It is therefore an object of the present invention to overcome the above-mentioned drawbacks of the related art by providing an image synthesizing apparatus and method, capable of combining two encoded code streams easily and effectively with a reduced use of the memory space.

The above object can be attained by providing an image synthesizing apparatus that synthesizes an encoded code stream by filtering first and second input images, generating code blocks each having a predetermined size via division of a subband resulted from the filtering, generating, per code block, a bit plane including bits from a most significant bit to a least significant bit, generating a coding pass by bit modeling of each bit plane, making input of first and second encoded code streams generated by making arithmetic coding within the coding pass, and combining the first and second encoded code streams to generate the synthetic encoded code stream, the apparatus including, according to the present invention, first and second image decoding means each including a code stream analyzing means for analyzing the first and second encoded code streams, a code block extracting means for extracting code block information on the basis of the result of analysis from the code stream analyzing means, and an arithmetic decoding means for making arithmetic decoding of the code block information; a synthesizing means for multiplying a coefficient value for each of the code blocks supplied from the first and second image decoding means by first and second real-number values, respectively, and adding the results of multiplication together; and an arithmetic coding means for making arithmetic coding of the result of addition from the synthesizing means to generate the synthetic encoded code stream.

Also, the above object can be attained by providing an image synthesizing method in which an encoded code stream is synthesized by filtering first and second input images, generating code blocks each having a predetermined size via division of a sub band resulted from the filtering, generating, per code block, a bit plane including bits from a most significant bit to a least significant bit, generating a coding pass by bit modeling of each bit plane, making input of first and second encoded code streams generated by making arithmetic coding within the coding pass, and combining the first and second encoded code streams to generate the synthetic encoded code stream, the method including, according to the present invention, first and second image decoding steps each including the steps of analyzing the first and second encoded code streams, extracting code block information on the basis of the result of analysis from the code stream analyzing means; and making arithmetic decoding of the code block information; a synthesizing step of multiplying a coefficient value for each of the code blocks supplied from the first and second image decoding means by first and second real-number values, respectively, and adding the results of multiplication together; and an arithmetic coding step of making arithmetic coding of the result of addition from the synthesizing means to generate the synthetic encoded code stream.

In the above image synthesizing apparatus and method, two code streams encoded according to the MPEG-2000 Standard for example, are combined together to generate the synthetic encoded code stream, which synthesis being effected in a coefficient domain, not in any spatial domain. Thus, the present invention permits to provide the same result as that of the synthesis in a spatial domain only by utilizing a part of an image decoder and encoder, that comply with the MPEG-2000 Standard, and with a smaller sharing of the memory capacity than in the synthesis in the spatial domain.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 5 explains a bit plane, in which

DETAILED DESCRIPTION OF THE PREFERRED EMBODIMENTS

The present invention will be described in detail below concerning an embodiment thereof with reference to the accompanying drawings. Prior to starting the description of the present invention, however, there will be described a conventional technique of generating a cross-faded image by combining two images and a conventional image synthesizer in which the conventional technique is applied for synthesis of images encoded according to the MPEG-2000 Standard.

Conventionally, a cross-faded image $G(x, y, t)$ is generated from an image $F_1(x, y, t)$ and image $F_2(x, y, t)$ via linear interpolation of samples existent in identical positions in different frames at the same time. The cross-faded image $G(x, y, t)$ is represented as given by the following formula (1):

$$G(x, y, t) = \alpha(t) \times F_1(x, y, t) + (1-\alpha(t)) \times F_2(x, y, t) \quad (1)$$

where x and y indicate horizontal and vertical coordinates of an image and t indicates the time.

Figure 1:
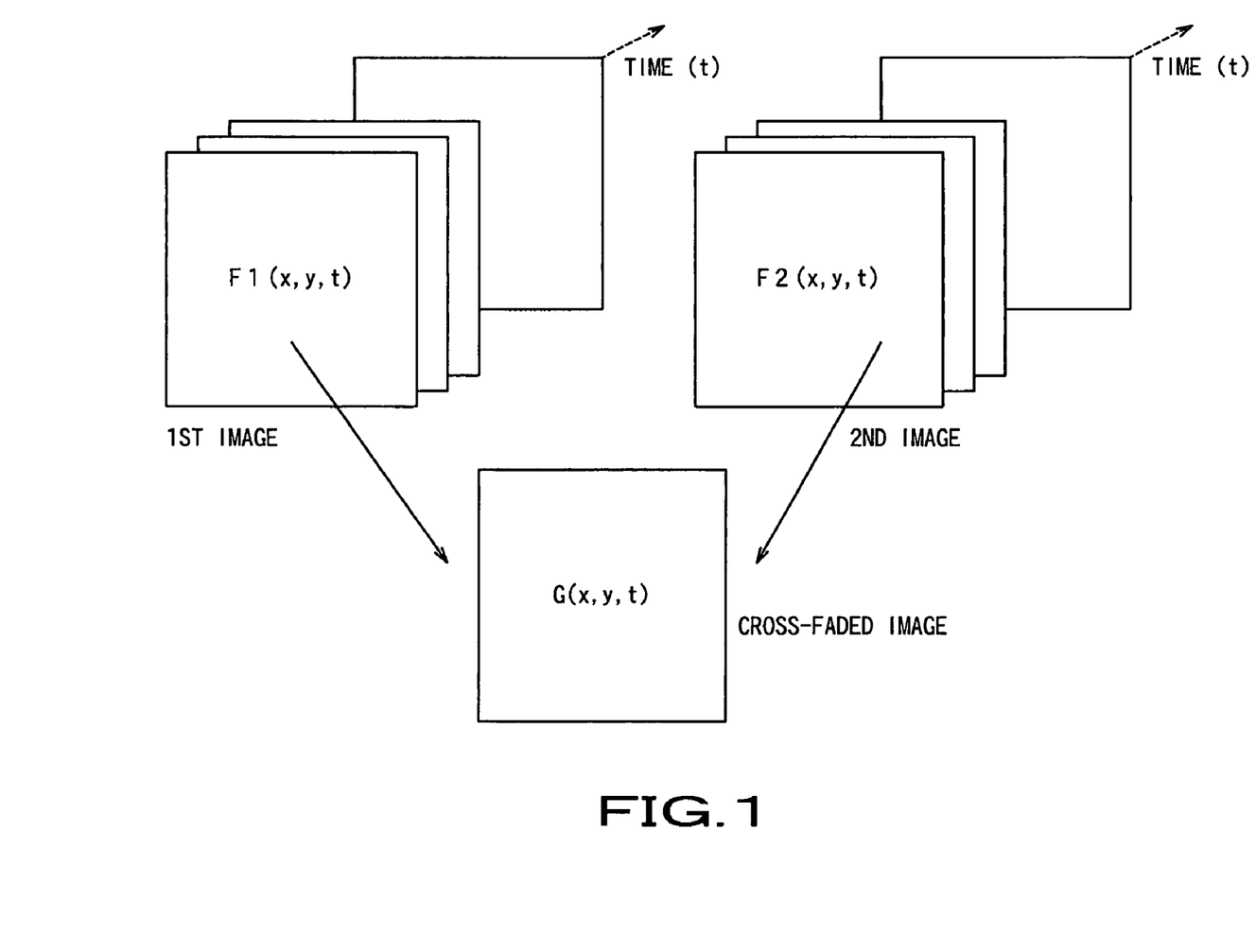
FIG. 1 explains the concept of a conventional cross-fading technique.
Figure 2:
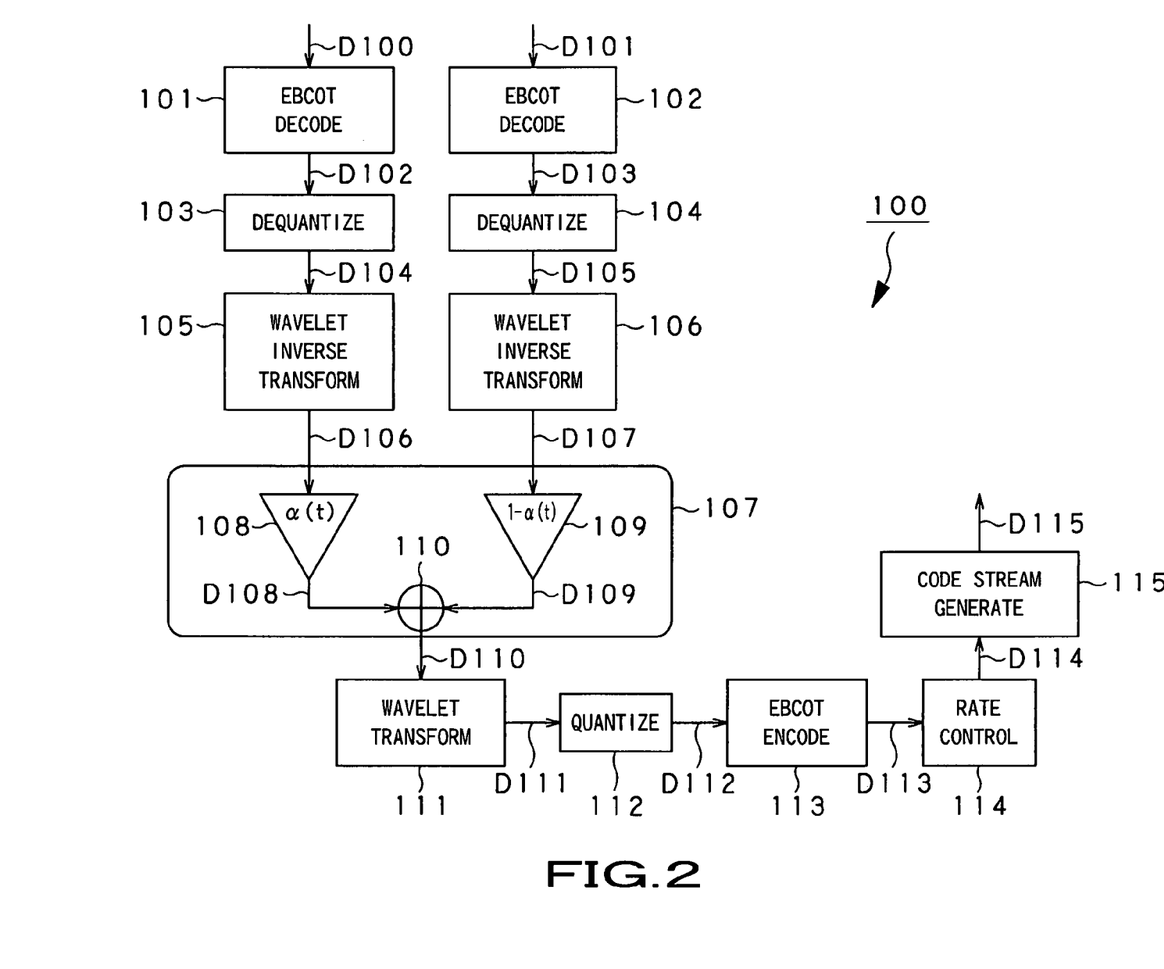
FIG. 2 is a schematic block diagram of a conventional image synthesizer in which the conventional cross-fading technique shown in FIG. 1 is adopted.

For application of the conventional technique for synthesis of images encoded according to the MPEG-2000 Standard, there is used an image synthesizer, generally indicated with a reference 100 in FIG. 2 for example. As shown, the image synthesizer 100 is supplied with code streams D100 and D101 encoded according to the MPEG-2000 Standard, and makes cross fading of the code streams D100 and D101 to provide an encoded code stream D115, having thus undergone the cross fading.

In the image synthesizer 100, an EBCOT (embedded coding with optimized truncation) decoder 101 decodes the encoded code stream D100 to generate a quantization coefficient D102, and supplies it to a dequantizer 103. This dequantizer 103 dequantizes the quantization coefficient D102 to generate a wavelet transform coefficient D104, and supplies it to a wavelet inverse-transformer 105. The wavelet inverse-transformer 105 makes wavelet inverse-transform of the wavelet transform coefficient D104 to generate a decoded image D106, and supplies it to and a cross-fading unit 107.

Similarly, an EBCTO decoder 102 decodes the encoded code stream D101 to generate a quantization coefficient D103, and supplies it to a dequantizer 104. The dequantizer 104 dequantizes the quantization coefficient D103 to generate a wavelength transform coefficient D105, and supplies it to a wavelet inverse-transformer 106. The wavelet inverse-transformer 106 makes wavelet inverse-transform of the wavelet transform coefficient D105 to generate a decoded image D107, and supplies it to the cross-fading unit 107.

The cross-fading unit 107 includes multipliers 108 and 109 and an adder 110. Making a calculation as given by the formula (1), the cross-fading unit 107 generates a cross-faded image D110. The multiplier 108 multiplies the decoded image D106 by a coefficient α(t), while the multiplier 109 multiplies the decoded image D107 by a coefficient (1−α(t)). Then, the adder 110 is supplied with images D108 and D109 from the multipliers 108 and 109, respectively, adds them together to provide a cross-faded image D110, and supplies the cross-faded image D110 to a wavelet transformer 111. It should be noted that the decoded images D106 and D107 and the cross-faded image D110 correspond to $F_1(x, y, t)$, $F_2(x, y, t)$ and $G(x, y, t)$, respectively, in the above formula (1).

With the above operations, the cross-faded image D110 is generated from the input encoded code streams D100 and D101. In a system downstream of the system down to the wavelet inverse-transformer 111, the cross-faded image D110 is encoded according to the MPEG-2000 Standard to generate an encoded code stream D115.

The wavelet transformer 111 is normally a filter bank including a low-pass filter and a high-pass filter. It should be noted that a digital filter has to be pre-buffered with a sufficient amount of input images for filtering since it normally shows an impulse response (filter factor) for a plurality of tap lengths. However, no digital filter is illustrated in FIG. 2 because its configuration is simple.

The wavelet transformer 111 is supplied with a minimum necessary amount of cross-faded images D110 for filtering and filters it for wavelet transform to generate a wavelet transform coefficient D111.

Figure 3:
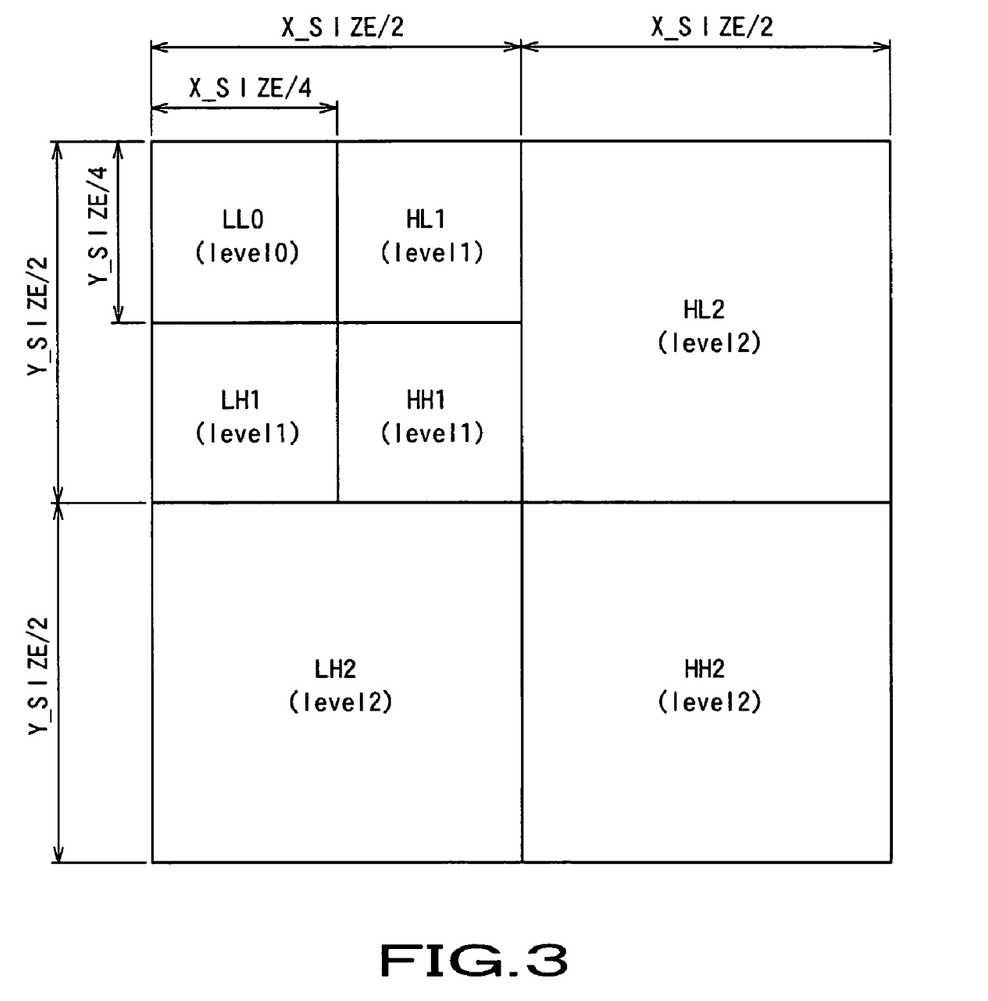
FIG. 3 explains subbands in wavelet transform down to a second level.

In the above wavelet transformation, a low-frequency component is normally repeatedly transformed as shown in FIG. 3 because majority of the image energy is concentrated to the low-frequency component. It should be noted that the level number of the wavelet transform in FIG. 3 is 2 (two), and thus a total of seven subbands is generated. More specifically, the horizontal size X_SIZE and vertical size Y_SIZE are halved by a first filtering to provide four subbands LL1, LH2, HL2 and HH2. The subband LL1 is quartered by a second filtering to provide four subbands LL0, LH1, HL1 and HH1. It should be noted that in FIG. 3, "L" and "H" indicate a low-frequency band and high-frequency band, respectively, and numbers suffixed to "L" and "H", respectively, indicate resolution levels, respectively. That is, "LH1", for example, indicates a subband having a resolution level of 1 (one) in which a low-frequency band extends horizontally while a high-frequency band extends vertically.

The synthesizer 100 further includes a quantizer 112 that makes irreversible compression of the wavelet transform coefficient D111 supplied from the wavelet transformer 111. This quantizer 112 may adopt a scalar quantization to divide the wavelet transform coefficient D111 by a quantization step size.

Also, the synthesizer 100 includes an EBCOT encoder 113 that makes an entropy coding, defined in the JPEG-2000 Standard and called "EBCOT", of the quantization coefficient D112 for each of the subbands generated by the quantizer 112 to generate an arithmetic code D113. The EBCOT encoder 113 encodes the quantization coefficient D112 for each of the aforementioned code blocks. It should be noted that the EBCOT (embedded coding with optimized truncation) is described in detail in "ISO/IEC FDIS 15444-1, JPEG-2000 Part-1 FDIS, 18 Aug., 2000" and the like.

Figure 4:
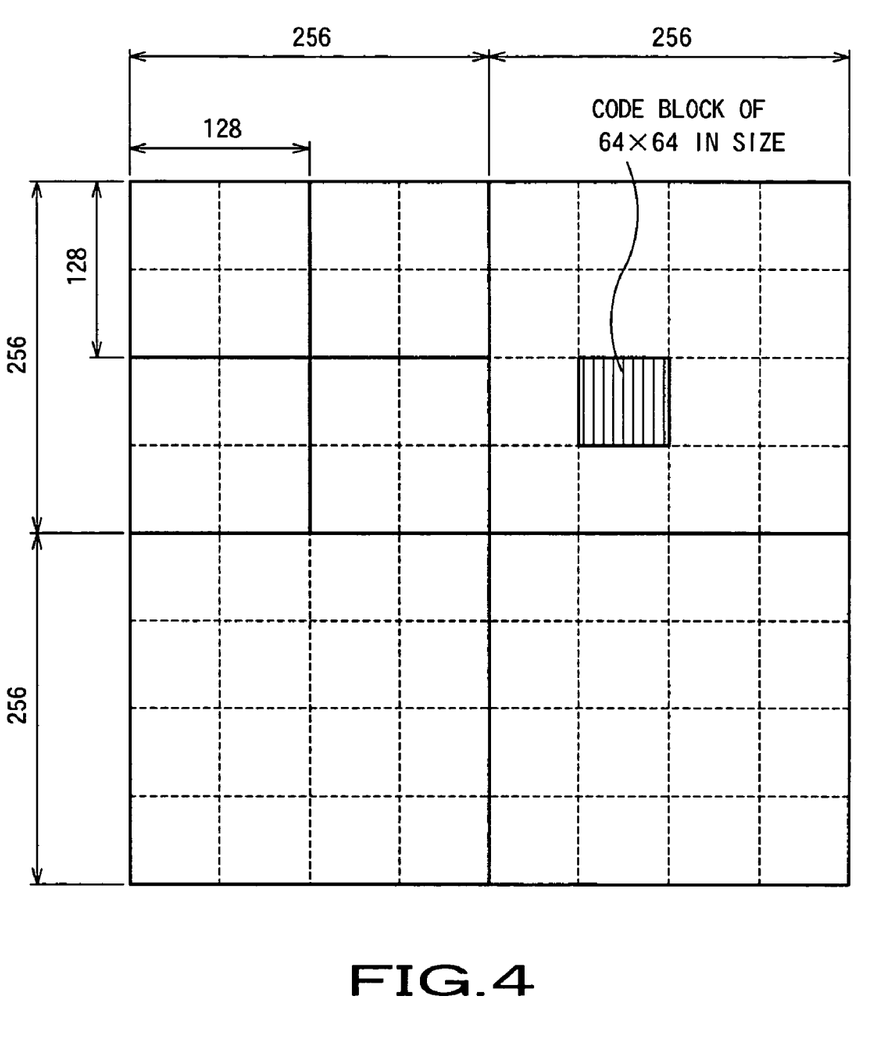
FIG. 4 explains the relation between code blocks and subbands.

More particularly, the EBCOT encoder 113 first divides the quantization coefficient D112 for each of the subbands generated by the quantizer 112 into code blocks that are units of coding defined in the JPEG-2000 Standard. Namely, code blocks each having a size of about 64×64 are generated in each of the subbands after thus divided as shown in FIG. 4. It should be noted that the JPEG-2000 Standard defines that the size of a code block is expressed by a power of 2 both horizontally and vertically and that a size of 32×32 or 64×64 is normally used in many cases.

Figures 5A, 5B, 5C:
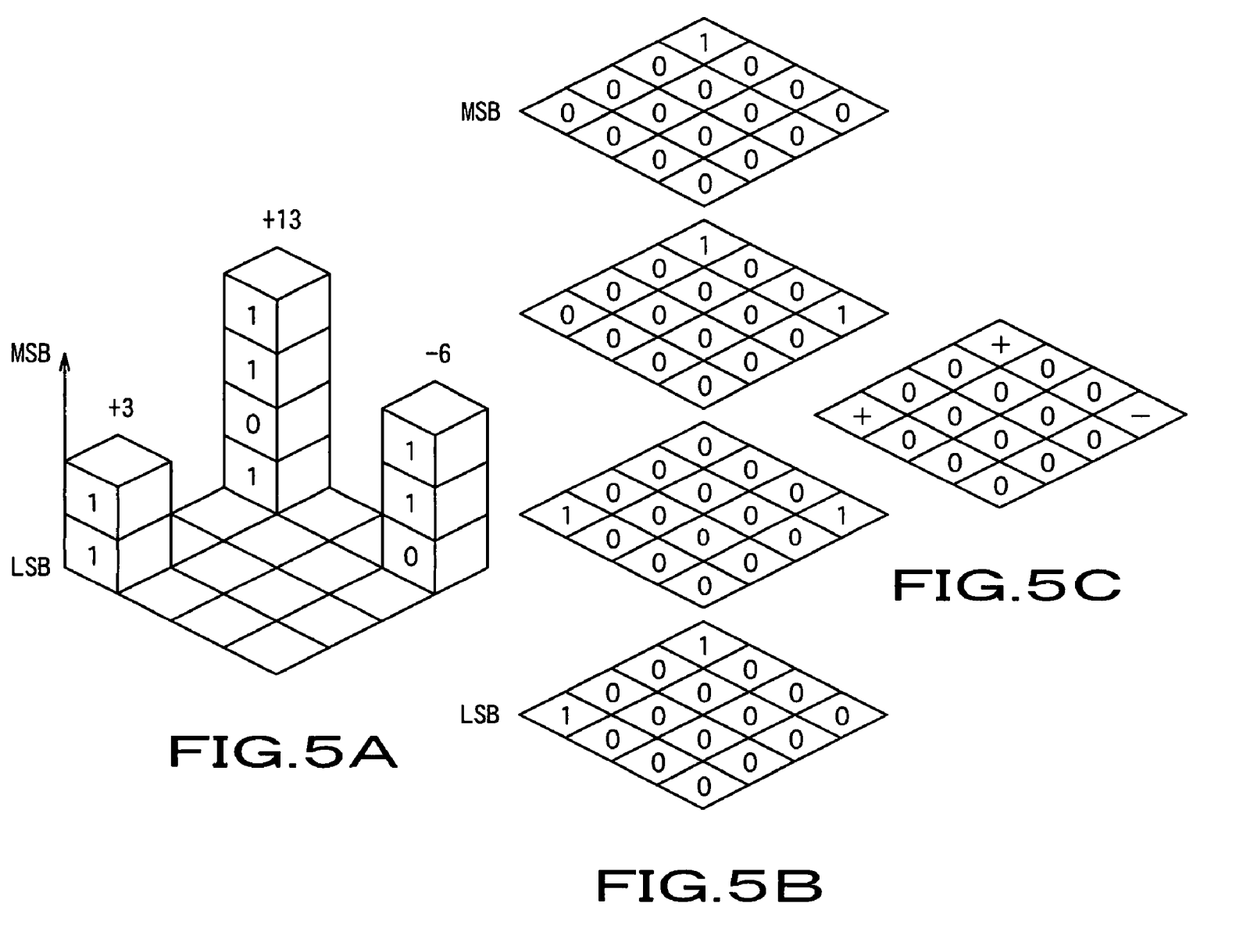
FIG. 5A shows a quantization coefficient consisting of 16 coefficients in total.
FIG. 5B shows a bit plane of the absolute values of the coefficient.
FIG. 5C shows a bit plane of codes.

Then, the EBCOT encoder 113 makes, for each bit plane, coefficient bit modeling of the quantization coefficient for each code block as will be described below. The concept of this bit plane will be described below with reference to FIG. 5. FIG. 5A shows an assumed quantization coefficient including a total of 16 coefficients (=4 vertical coefficients by 4 horizontal coefficients). The largest absolute-value one of these 16 quantization coefficients is 13 (thirteen) that is binary-notated as "1101". Therefore, the bit planes defined by the coefficient absolute-values include four as shown in FIG. 5B. It should be noted that all elements in each bit plane take a number 0 (zero) or 1 (one). On the other hand, the only one of the quantization coefficients which has a negative sign is "–6", while all the other quantization coefficients are 0 (zero) and positive-signed ones. Therefore, the bit plane of signs is as shown in FIG. 5C.

Each of the code blocks is encoded per bit plane independently in a direction from the most significant bit (MSB) to least significant bit (LSB). A quantization coefficient is expressed by a signed binary number of n bits, and bit 0 to bit (n-2) represent the bits, respectively, included between LSB and MSB. It should be noted that the remaining one bit is a sign. The code blocks are sequentially encoded starting with the MSB-side bit plane via three types of coding passes as shown below:

(a) Significant propagation pass (also called SP pass)
(b) Magnitude refinement pass (also called MR pass)
(c) Clean-up pass (also called CU pass)

Figure 6:
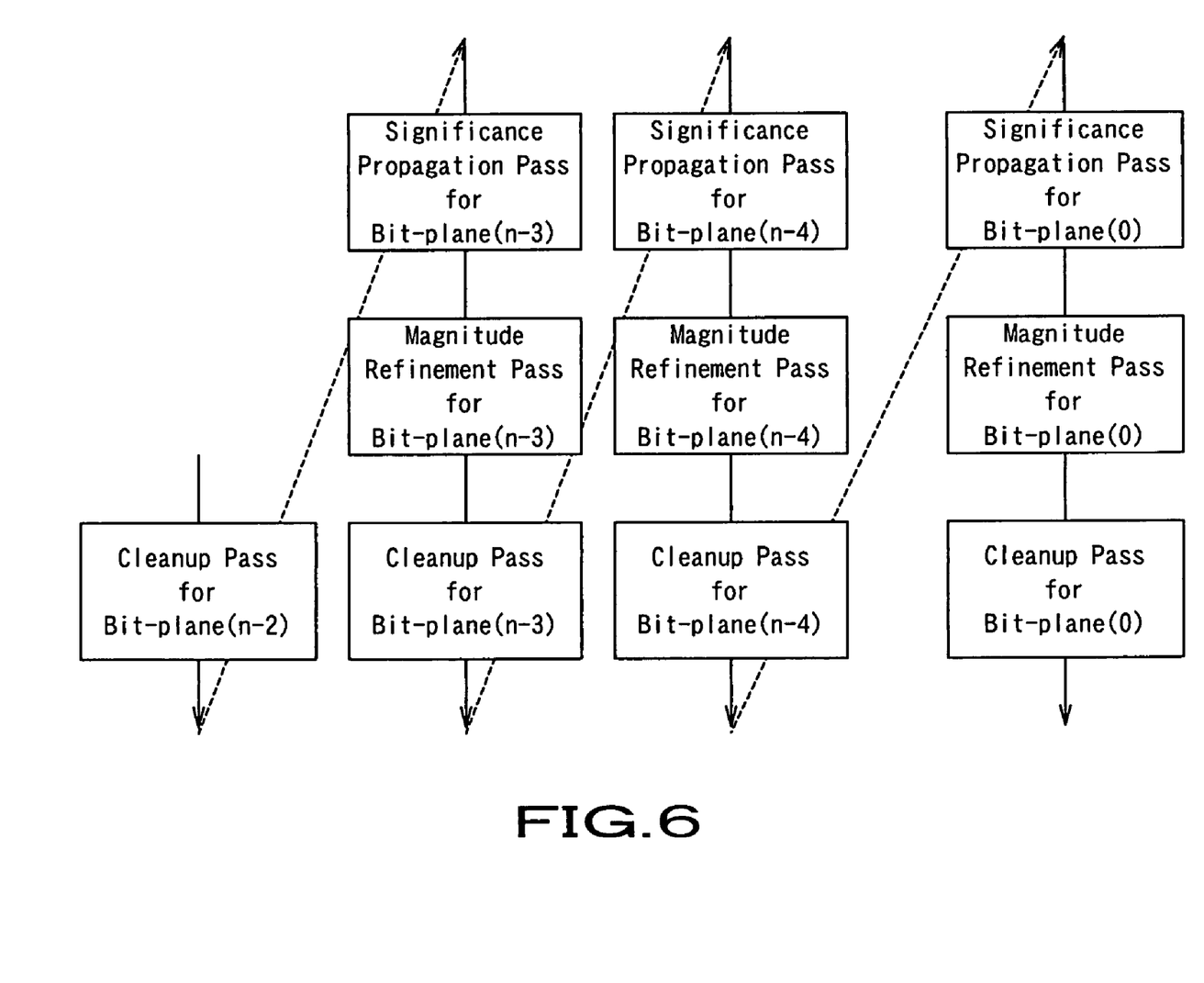
FIG. 6 explains a procedure of processing a coding pass in the code block.

The three types of coding passes are used in a sequence as shown in FIG. 6. As shown in FIG. 6, a bit plane (n−2) at the MSB side is first encoded via the CU pass. Next, bit planes are sequentially encoded toward the LSB side. The bit planes are encoded via the SP pass, MR pass and CU pass in this order.

Actually, however, it is written in a header in which bit plane counted from the MSB there will appear "1", and all-zero bit planes will not be encoded. The three types of coding passes are repeatedly used in this order to encode the bit planes, and the encoding is ceased after an arbitrary bit plane is encoded via an arbitrary one of the coding passes. Thereby, a tradeoff can be made between the bit rate and image quality, namely, the bit rate can be controlled.

Figure 7:
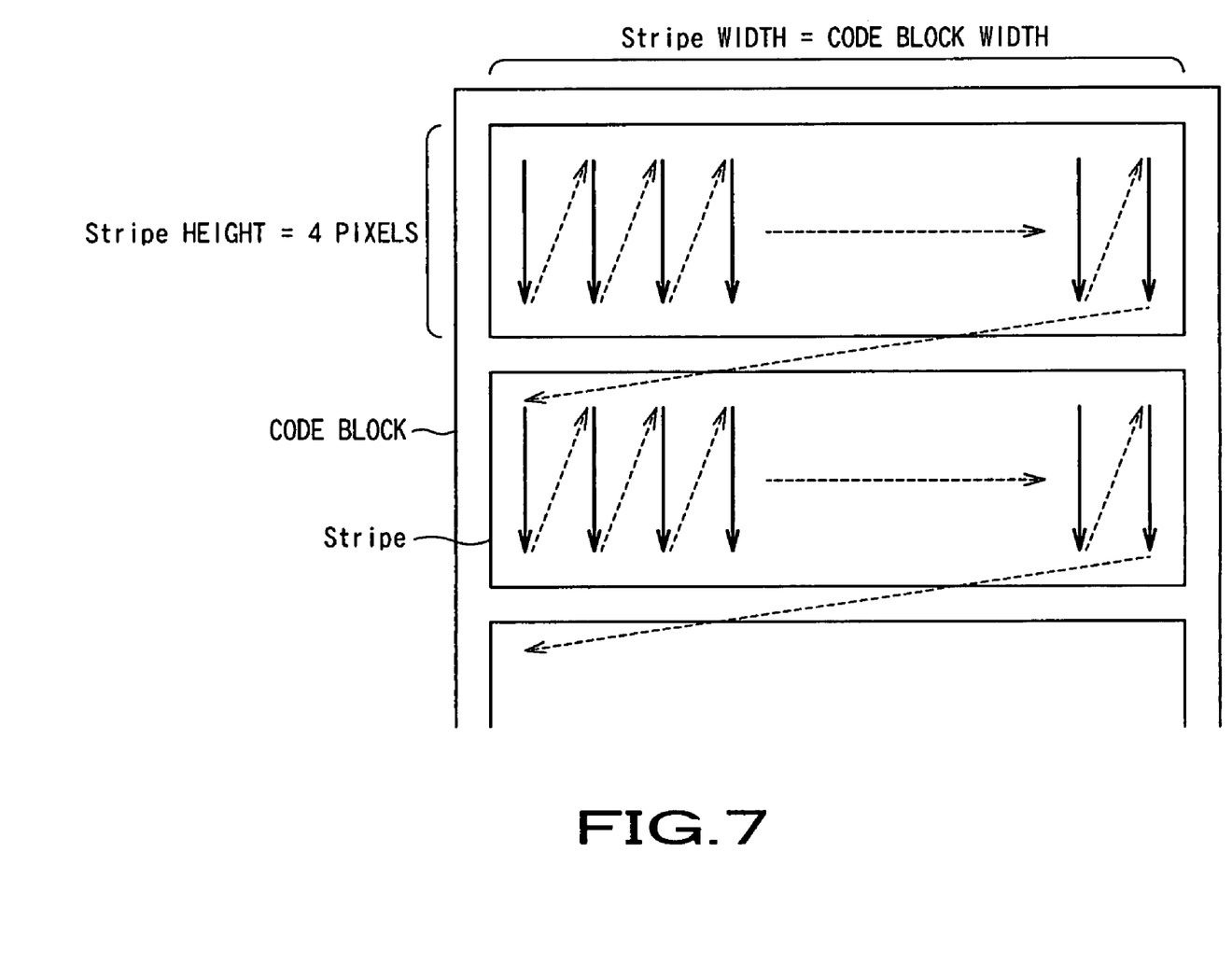
FIG. 7 explains a procedure of scanning the coefficients in the code block.

The coefficients are scanned as will be described below with reference to FIG. 7. The code blocks are grouped at each height of four coefficients into a stripe. The stripe is as wide as the width of the code block. The "scanning sequence" means a sequence in which all coefficients in one code block are scanned. In a code block, the coefficients are scanned in a sequence from the upper to lower stripe. In each stripe, the coefficients are scanned in a sequence from the left to right row. In each of the rows, the coefficients are scanned in a sequence from the top to bottom. It should be noted that in each coding pass, all the coefficients in a code block are scanned in these sequences of scanning.

As above, the EBCOT encoder 113 decomposes the quantization coefficient in each code block into bit planes, each of the bit planes into three coding passes, and generates a quantization coefficient for each of the coding passes. Then, the EBCOT encoder 113 makes arithmetic coding of the quantization coefficient for each coding pass.

The image synthesizer 100 further includes a rate controller 114 that controls the bit rate to approximate a target bit rate or compression ratio while counting the amount of the arithmetic codes D113 supplied from the EBCOT encoder 113. More specifically, the rate controller 114 controls the bit rate by truncating at least a part of the coding pass for each code block.

The image synthesizer 100 also includes a code stream generator 115 that packetizes the rate-controlled arithmetic code D114 supplied from the rate controller 114 according to the JPEG-2000 Standard, and adds a header to the packet to provide a final encoded code stream D115.

As above, in the image synthesizer 100, the two encoded code streams encoded according to the MPEG-2000 Standard, are supplied for cross fading. When outputting the encoded code streams after cross fading, two images are combined in a spatial domain to generate a cross-faded image, then the cross-faded image is encoded to generate a cross-faded encoded code stream.

For the image synthesizer 100 configured as above, however, there should be used a memory to store the two decoded images and also a memory to store the cross-faded image. Also, the image synthesizer 100 needs an image decoder and image encoder, both complying with the JPEG-2000 Standard.

The image synthesizer according an embodiment of the present invention makes cross fading in the coefficient domain, not in the spatial domain, to overcome the above-mentioned drawbacks of the conventional image synthesizer. This will be explained herebelow.

Figure 8:
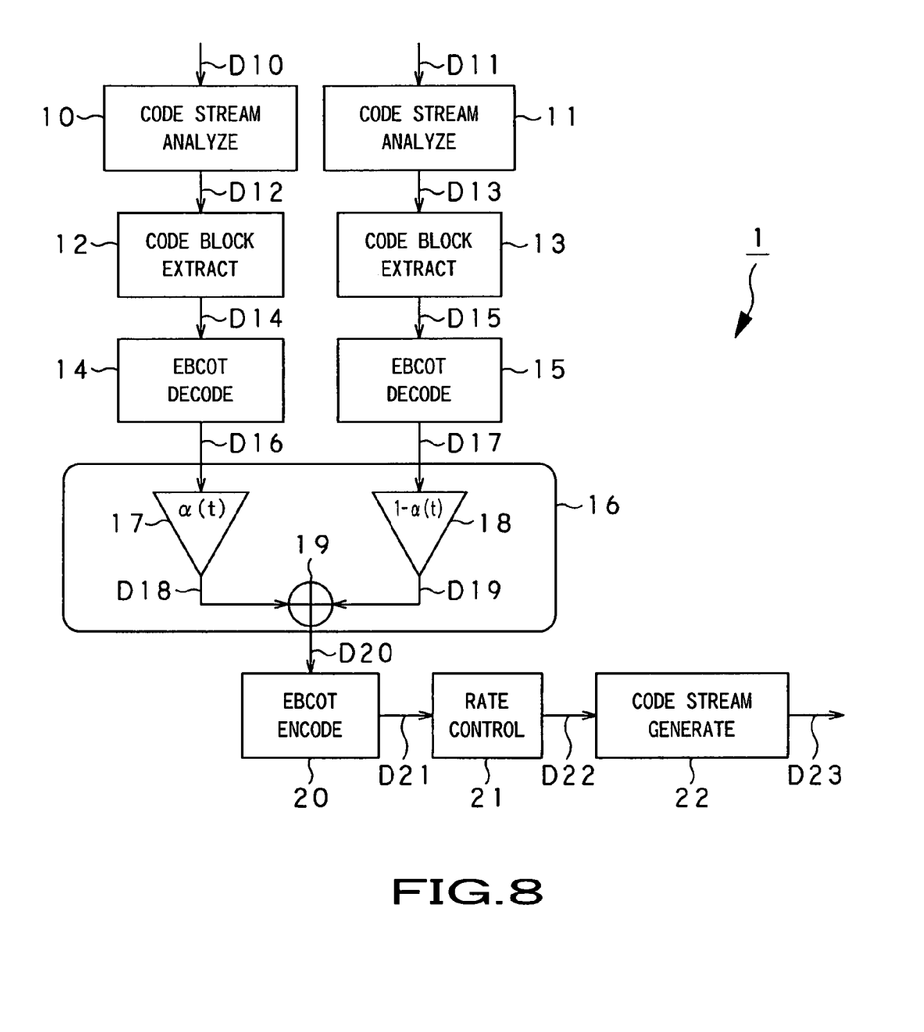
FIG. 8 is a schematic block diagram of an image synthesizer as an embodiment of the present invention.

Referring now to FIG. 8, there is schematically illustrated in the form of a block diagram the image synthesizer as the embodiment of the present invention. As shown in FIG. 8, the image synthesizer as the embodiment of the present invention is generally indicated with a reference 1. As shown, it includes code stream analyzers 10 and 11, code block extraction units 12 and 13, EBCOT decoders 14 and 15, cross-fading unit 16, EBCOT encoder 20, rate controller 21, and a code stream generator 22. The cross-fading unit 16 includes multipliers 17 and 18 and an adder 19.

The code stream analyzer 10 is supplied with a code stream D10, encoded according to the JPEG-2000 Standard, and analyzes the encoded code stream D10 with a technique defined in the MPEG-2000 Standard. The code block extraction unit 12 supplies encoded information D14 for each code block to the EBCOT decoder 14 according to analysis information D12 supplied from the code stream analyzer 10. The EBCOT decoder 14 decodes the encoded information D14 to generate a quantization coefficient D16 for each code block, and supplies the quantization coefficient D16 to the cross-fading unit 16.

Similarly, the code stream analyzer 11 is supplied with a code stream D11, encoded according to the JPEG-2000 Standard, and analyzes the encoded code stream D11 with a technique defined in the MPEG-2000 Standard. The code block extraction unit 13 supplies encoded information D15 for each code block to the EBCOT decoder 15 according to analysis information D13 supplied from the code stream analyzer 11. The EBCOT decoder 15 decodes the encoded information D15 to generate a quantization coefficient D17 for each code block, and supplies the quantization coefficient D17 to the cross-fading unit 16.

The cross-fading unit 16 includes the multipliers 17 and 18 and adder 19. Combining the quantization coefficients D16 an dD17, the cross-fading unit 16 generates a cross-fading quantization coefficient D20. More specifically, on the assumption that the quantization coefficient D16 is Q_cb1(x, y) and quantization coefficient D17 is Q_cb2(x, y), the cross-fading unit 16 generates a cross-fading quantization coefficient using the following formula (2).

It should be noted that since Q_cb1(x, y) and Q_cb2(x, y) are assumed to be at the same time, no time t is necessary as a parameter as in the above formula (1):

$$G\_Q(x, y) = \alpha(t) \times Q\_cb1(x, y) + (1-\alpha(t)) \times Q\_cb2(x, y) \quad (2)$$

where x and y indicate horizontal and vertical positions, respectively, of the quantization coefficient domain.

That is, the multiplier 17 multiplies the quantization coefficient D16 by a coefficient α(t), and multiplier 18 multiplies the quantization coefficient D17 by a coefficient (1−α(t)). The adder 19 adds the quantization coefficients D18 and D19 supplied from the multipliers 17 and 18 to provide a cross-fading quantization coefficient D20, and supplies the cross-fading quantization coefficient D20 to the EBCOT encoder 20.

The EBCOT encoder 20 makes EBCOT entropy coding of the cross-fading quantization coefficient D20 from the cross-fading unit 16 to generate an arithmetic code D21.

The rate controller 21 controls the bit rate to approximate a target bit rate or compression ratio while counting the amount of the arithmetic codes D21 supplied from the EBCOT encoder 20. More specifically, the rate controller 21 controls the bit rate by truncating at least a part of the coding pass for each code block. It should be noted that the arithmetic code D21 may be supplied as it is to the code stream generator 22 while controlling the bit rate. In this case, the image synthesizer 1 does not need the rate controller 21.

The code stream generator 22 packetizes the rate-controlled arithmetic code D22 supplied from the rate controller 21 according to the JPEG-2000 Standard, and adds a header to the packet to provide a final encoded code stream D23.

Figure 9:
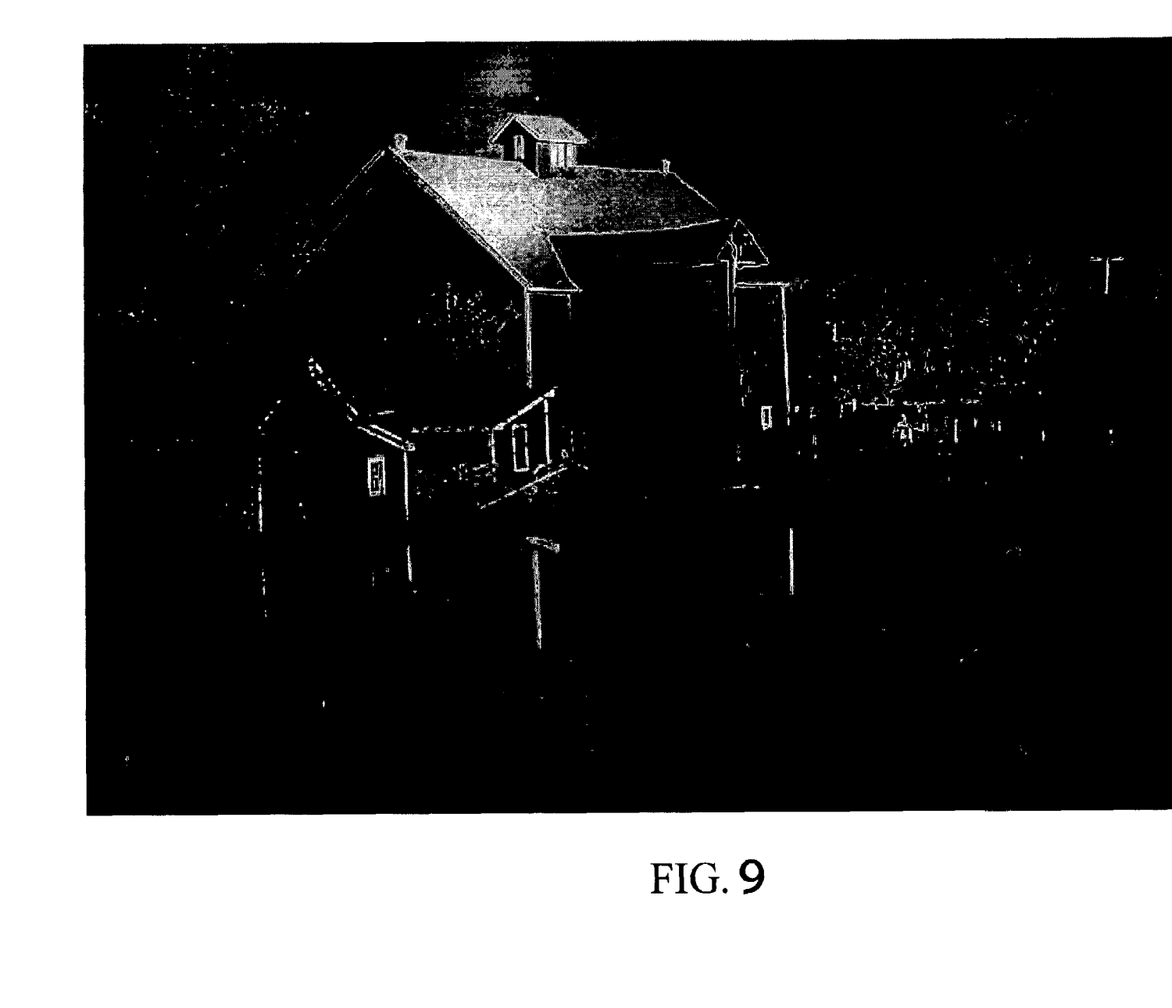
FIG. 9 shows an example of a cross-faded image when α=0.2.
Figure 10:
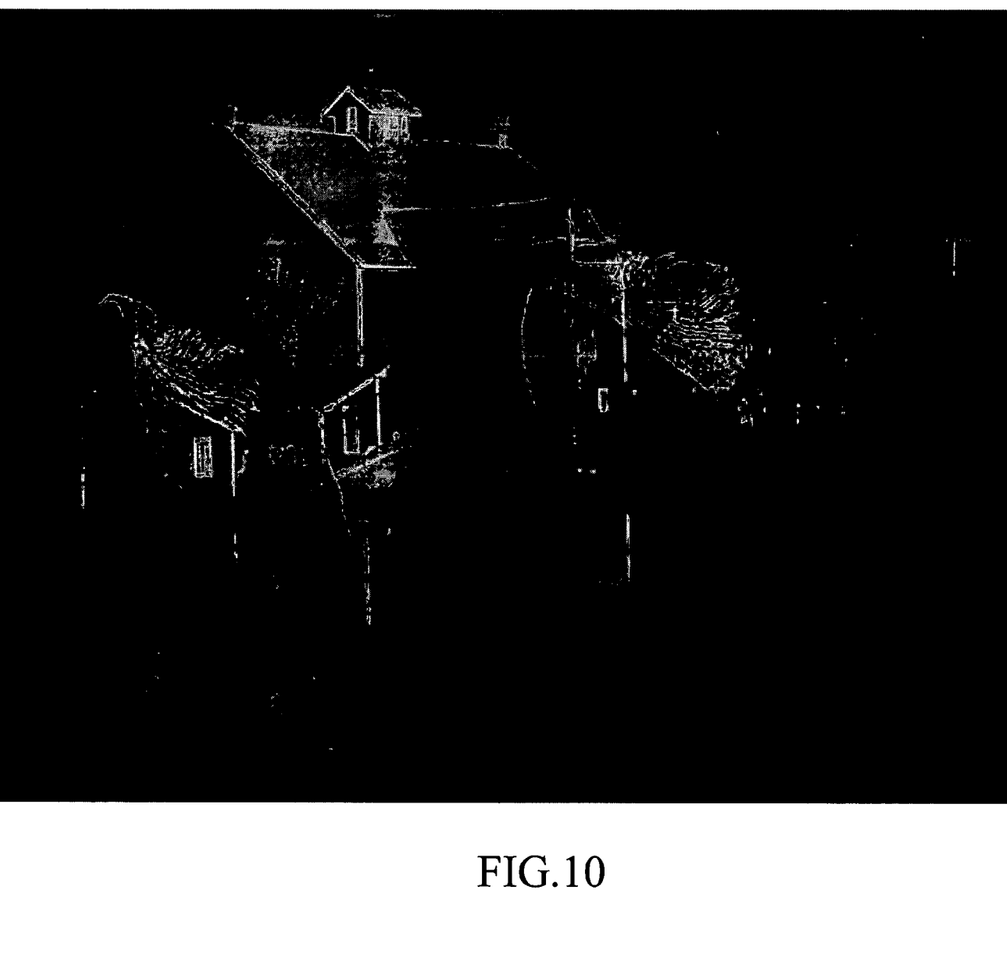
FIG. 10 shows an example of a cross-faded image when α=0.5.
Figure 11:
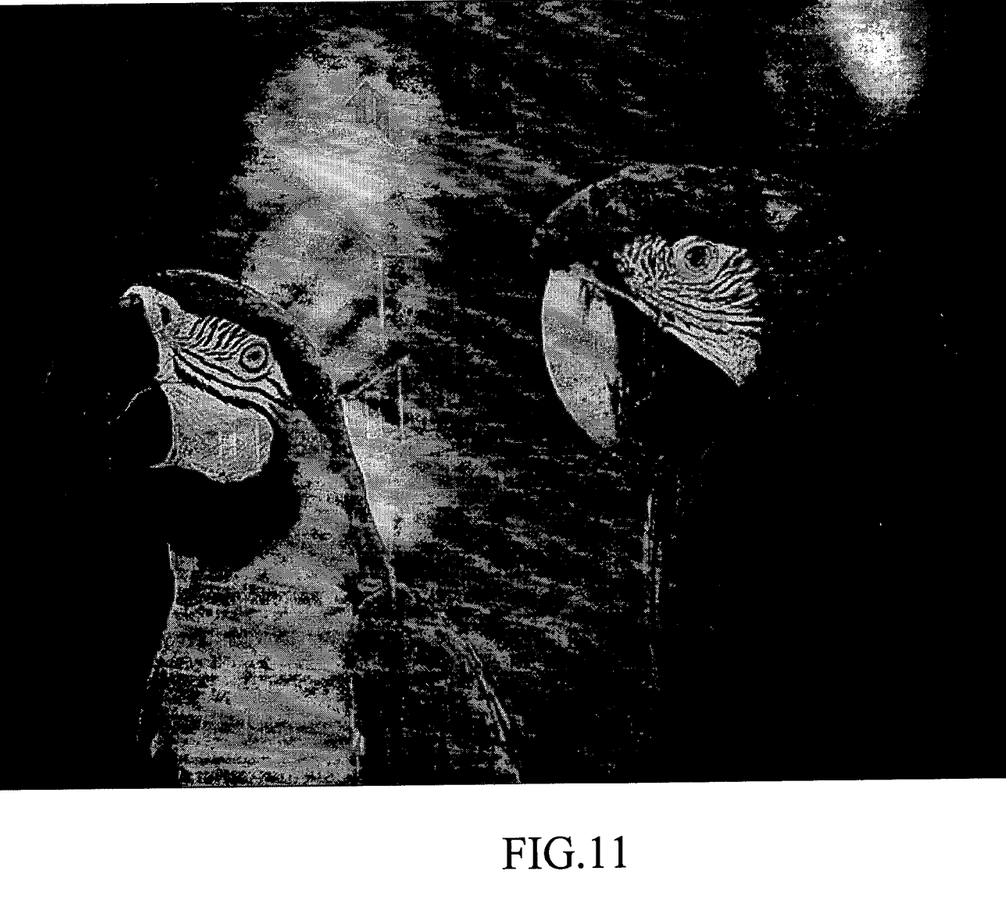
FIG. 11 shows an example of a cross-faded image when α=0.8.

The encoded code streams D10 and D11 are ones resulted from coding of an parrot image and a house-including landscape. FIGS. 9 to 11 show cross-faded images processed by the cross-fading unit 16 with α=0.2, α=0.5 and α=0.8, respectively. As seen in FIGS. 9 to 11, the house-including landscape and parrot image appear smoothly faded. It should be noted that FIGS. 9 to 11 show images resulted from cross fading with three values of α: α=0.2, α=0.5 and α=0.8 but the smoothness of cross fading can be changed in degree by changing the ratio in time change among the values of α(t).

As having been described in the foregoing, the image synthesizer 1 as the embodiment of the present invention makes cross fading of input two code streams encoded according to the JPEG-2000 Standard to provide a cross-faded encoded code stream. The cross fading in the coefficient domain can provide the same result as that of a cross fading in the spatial domain, and uses only a part of the image decoder and encoder that comply with the JPEG-2000 Standard.

Also, the cross fading in the coefficient domain advantageously uses the memory capacity less than the cross fading in the spatial domain. In particular, since the image synthesizer 1 as the embodiment of the present invention makes cross fading for each code block, so it can make the cross fading with a rather smaller use of the memory capacity than that in the cross fading made for an entire image.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

For example, in the aforementioned image synthesizer 1, the image decoding means (code stream analyzer 10, code block extraction unit 12 and EBCOT decoder 14) provided for decoding the encoded code stream D10 down to the quantization coefficient D16, and the image decoding means (code stream analyzer 11, code block extraction unit 13 and EBCOT decoder 15) provided for decoding the encoded code stream D11 down to the quantization coefficient D17, may be separately provided or may be included in one image decoder. In the latter case, the image decoding can be parallelized using the technique called "pipeline processing" used in many hardware.

What is claimed is:

1. An image synthesizing apparatus for synthesizing an encoded code stream, the apparatus comprising: first and second image decoding means comprising:
   a code stream analyzing means for analyzing a first and second encoded code streams;
   a code block extracting means for extracting code block information based on the result of the code stream analyzing means; an arithmetic decoding means for arithmetically decoding a code block based on the code block information;
   a generating means for generating a quantization coefficient for the code block decoded by the arithmetic decoding means; and
   a supplying means for supplying the quantization coefficients to a cross-fading unit;
   a synthesizing means for synthesizing a cross-fading quantization coefficients by supplying the quantization coefficient for each of the code blocks supplied from the first and second image decoding means to first and second multipliers, the first and second multipliers multiplying the quantization coefficients for each of the code blocks by first and second real-number values, respectively, and adding the results of multiplication together by supplying the results to an adder, the adder generating the cross-fading quantization coefficient; and
   an arithmetic coding means for arithmetically coding the cross-fading quantization coefficient from the synthesizing means to generate a cross-faded encoded code.

2. The apparatus according to claim 1, wherein the sum of the first and second real-number values is 1 (one).

3. The apparatus according to claim 1, wherein both the first and second image decoding means form the same image decoding means.

4. The apparatus according to claim 1, wherein the first and second real-number values vary at variable rates, respectively.

5. An image synthesizing method in which an encoded code stream is synthesized, the method comprising:
   first and second image decoding steps comprising
   analyzing a first and second encoded code streams;
   extracting code block information based on the result of the code stream analysis;
   arithmetically decoding a code block based on the code block information;

generating a quantization coefficient for the arithmetically decoded code block; and supplying the quantization coefficient to a cross-fading unit;

synthesizing a cross-fading quantization coefficients by supplying the quantization coefficient for each of the code blocks supplied from the first and second image decoding steps to first and second multipliers, the first and second multipliers multiplying the quantization coefficients for each of the code blocks by first and second real-number values, respectively, and adding the results of multiplication together by supplying the results to an adder, the adder generating the cross-fading quantization coefficient; and arithmetically coding the cross-fading quantization coefficient to generate a cross-faded encoded code stream.

* * * * *